C. F. ASPLUND.
CENTRIFUGAL CLUTCH.
APPLICATION FILED OCT. 13, 1920.
1,418,350.
Patented June 6, 1922.
2 SHEETS—SHEET 1.
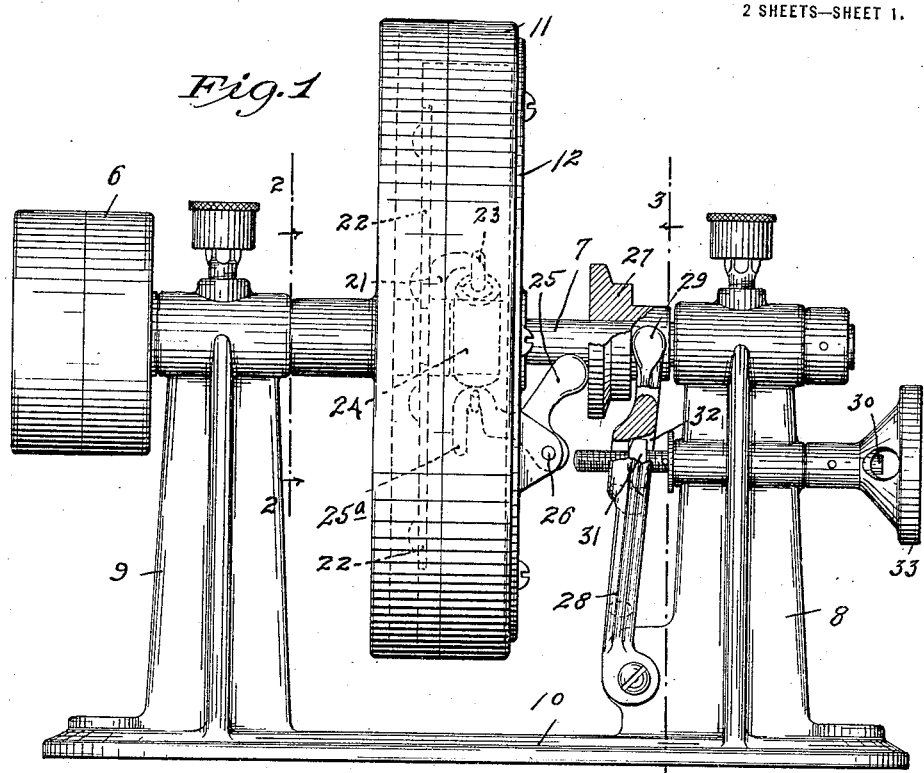
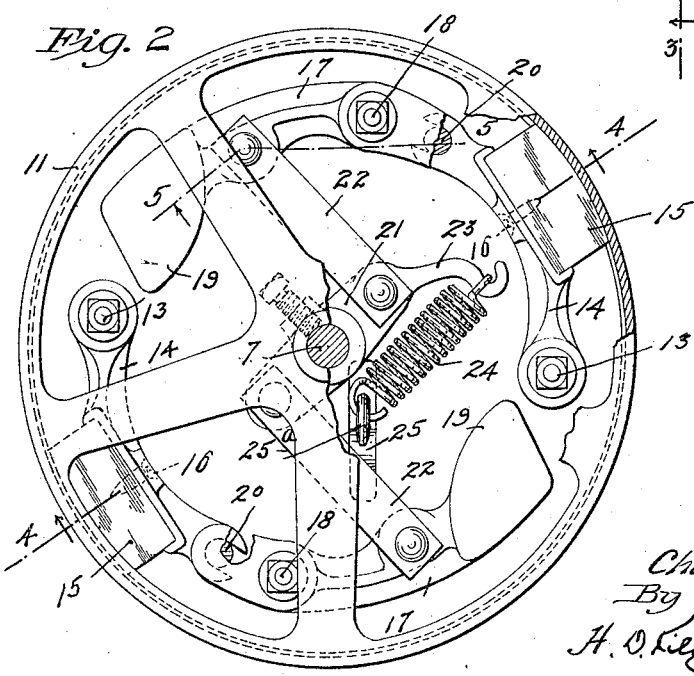
Inventor
Charles F. Asplund
By his Attorney
H. O. Kilgore

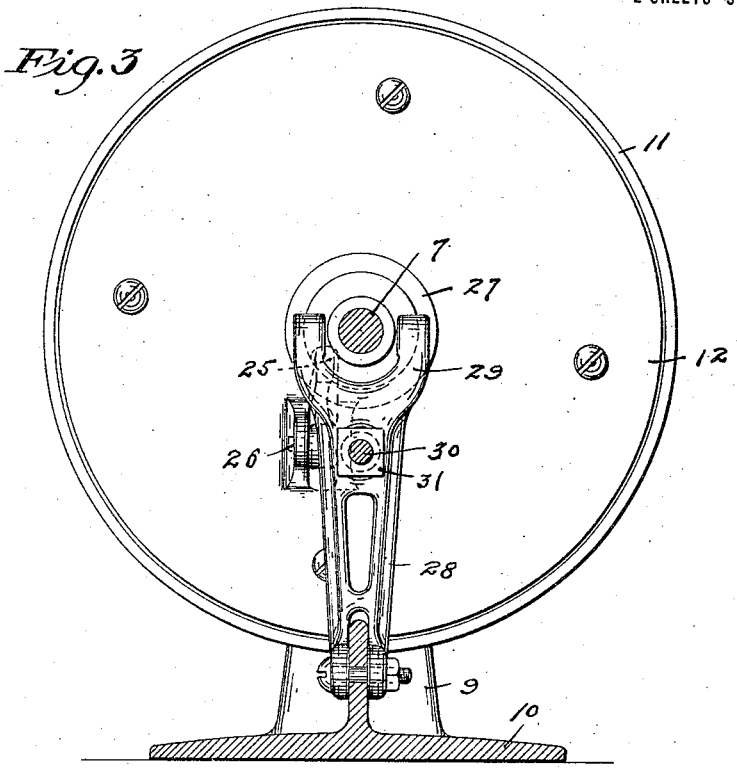
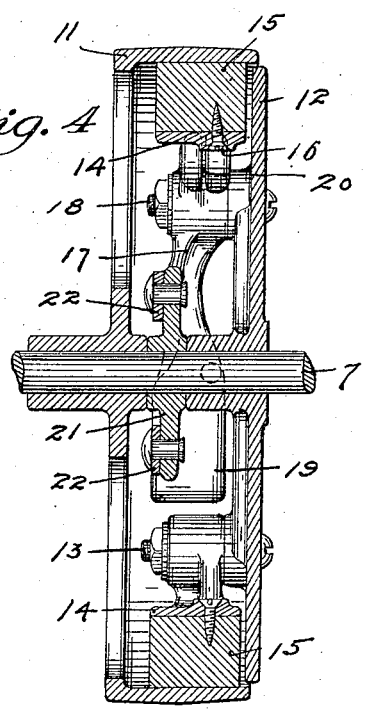
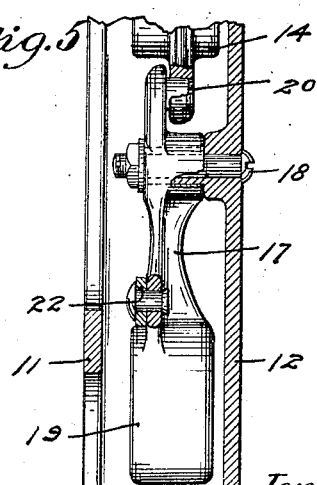

UNITED STATES PATENT OFFICE.

CHARLES F. ASPLUND, OF MINNEAPOLIS, MINNESOTA.

CENTRIFUGAL CLUTCH.

1,418,350.  Specification of Letters Patent.  Patented June 6, 1922.

Application filed October 13, 1920. Serial No. 416,726.

*To all whom it may concern:*

Be it known that I, CHARLES F. ASPLUND, a citizen of the United States, residing at Minneapolis, in the county of Hennepin and State of Minnesota, have invented certain new and useful Improvements in Centrifugal Clutches; and I do hereby declare the following to be a full, clear, and exact description of the invention, such as will enable others skilled in the art to which it appertains to make and use the same.

My invention has for its object to provide an improved centrifugal clutch of the type which will be automatically released when a predetermined speed is exceeded, but which clutch may be adjusted while in action, so that the predetermined speed at which it will throw out of action may be varied.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation showing the clutch mechanism applied to connect a shaft to a pulley, some parts being sectioned;

Fig. 2 is a section on the line 2—2 of Fig. 1, some parts being broken away;

Fig. 3 is a section taken approximately on the line 3—3 of Fig. 1;

Fig. 4 is a section on the line 4—4 of Fig. 2; and

Fig. 5 is a fragmentary view taken in section approximately on the line 5—5 of Fig. 2, some parts being shown in full.

In the particular arrangement illustrated, power is transmitted through a belt, not shown, from a pulley 6 carried by a driven shaft 7 journaled in suitable bearing pedestals 8 and 9 on a base 10. Loosely mounted on the driven shaft 7, but held against axial movements, is a driving wheel in the form of a pulley 11, one side of which is open to loosely receive a disk or plate 12 that is rigidly secured to and rotates with the driven shaft 7.

Pivoted to the inner face of the disk 12, at 13, is a pair of diametrically opposite clutch levers 14 that are equipped with clutch shoes 15, preferably in the form of wooden blocks set into seats formed in the intermediate portions thereof and detachably held thereto by screws 16. The outer surfaces of the shoes 15 are convexly curved to fit or closely engage the inner surface of the rim of the pulley 11.

The numeral 17 indicates centrifugally actuated governor levers that are pivotally connected at 18 to the disk 12 and, at their long ends, are provided with weights 19. The short ends of the levers 17 are preferably designed, so that they embrace the free ends of the clutch members 14 and are provided with pins 20 that engage notches formed in the ends of said levers 14.

The numeral 21 indicates a rocker arm loosely mounted on the driven shaft 7, between the hub of the pulley 11 and the hub of the disk 12. The opposite ends of this rocker arm 21 are connected by links 22 to the intermediate portions of the long ends of the weighted governor levers 17. At one end, the rocker arm 21 is provided with an extended finger 23, the end of which is hook-shaped and is connected to one end of a coiled tension spring 24, the other end of which spring is anchored to the hooked inner end 25ª of a sort of a bell-crank lever 25. This lever 25 works through a slot in the disk 12 and is pivoted at 26 to laterally spaced ears on the outer surface of said disk. Said lever 25, as will presently be noted, affords an adjustable base of reaction or anchor for the spring 24 and, hence, may be designated as an adjustable spring anchor.

The outer end of the lever 25 is preferably rounded and bears against the opposing face of a lever-shifting collar 27 that is loose to slide on the driven shaft 7 and may be also loose to rotate thereon.

For adjusting the collar 27 axially on the shaft 7, I provide an arm 28 that is pivoted to the pedestal 8, at its lower end, and, at its upper end, is forked so that it embraces the hub of the collar 27 and its prongs 29 bear against an adjacent face or shoulder of said collar.

For adjustably seating the arm 28, a screw or threaded rod 30 is swivelled in the pedestal 8 and has threaded engagement with a nut 31 that is seated in a depression 32 formed in the intermediate portion of said arm 28. The depression 32 holds the nut 31 against rotation, so that when the screw 30 is rotated, said arm will be moved either toward or from the pulley. At its other end, the screw 30 is shown as provided with a head 30, which facilitates rotation thereof.

The power for driving the clutch, in the arrangement illustrated, will be transmitted thereto through a power-driven belt, not shown, but which will run over the driving pulley 11.

The tension of the spring 24 is such that it tends to hold the weighted ends 19, of the governor levers 17, radially inward, and the clutch shoes 15 radially outward in frictional driving contact with the inner surface of the flange of the pulley 11. Hence, normally, the pulley 11 will be coupled to the driven shaft 7 and will drive the same.

When, however, the shaft and pulley are driven at a predetermined speed, which is sufficient to overcome the tension of the spring 24, the weighted ends 19 of the levers 17 will be thrown outward by centrifugal force, thereby disengaging the clutch shoes 15 from the pulley rim, thus disconnecting the shaft 7 from the continuously driving pulley 11 and allowing said shaft to drop back or decrease its speed until the tension of the spring 24 overcomes centrifugal force and again throws the shoes 15 against the rim of the pulley 11; thus, even if the pulley 11 is driven at a speed considerably higher than the predetermined speed for which the clutch is set for action, the shaft 7 will be driven therefrom always at the predetermined speed, the centrifugally actuated clutch simply coming into and out of action to keep up the predetermined speed of said shaft.

The predetermined speed may, of course, be varied, at will, by adjustments of the screw 30, arm 28, collar 27 and bell-crank lever 25, which latter regulates the tension of the spring 24. For example, with the pulley 11 running at 600 revolutions per minute, the predetermined speed at which the shaft 7 will be driven may be varied from 600 revolutions to any lesser number of revolutions permitted. To illustrate more specifically, with the pulley 11 driven at 600 revolutions per minute, the shaft 7, through the automatic clutch mechanism, may be driven at 550, 500, 450, or 400 revolutions; and the variation may be made step by step through the finest kind of adjustments.

Not only is the clutch mechanism itself exceedingly efficient, but the means for adjusting the same for different predetermined speeds, is simple and efficient and capable of being readily operated while the clutch is in action; that is, while the pulley and shaft are being rotated.

In most uses or applications of the device described, the loose pulley 11 will be the driving member and the shaft 7 the driven member, but in some places or for some uses, the arrangement might be reversed; that is, the shaft 7 might be the driving member and the pulley 11 the driven member. The utility of this invention, has been demonstrated in actual practice.

It is important to note that, in this improved clutch mechanism, the weighted centrifugally actuated levers are all enclosed within a casing afforded by the pulley and co-operating adjacent disk, thus eliminating the necessity for any specially constructed or independent casing, to prevent contact of the levers with persons working or operating in the vicinity thereof. Moreover, the driving pulley and parts carried thereby and by the disk, and including the levers, when in action, operate as a fly-wheel to store up power, which assists in producing an even and approximately constant speed of rotation of the driven shaft. Otherwise stated, the pulley affords a combined drive-wheel, fly-wheel and casing.

A clutch mechanism of this character will be found especially serviceable for driving cream separators, churns, electrical generators and other machines which should be operated at constant speed from a driving shaft or member that may rotate at a variable but high speed.

What I claim is:

1. The combination with a shaft and a pulley primarily loose thereon, said pulley having a rim with an internal friction surface, a disk secured to said shaft, spring-set centrifugally released clutch mechanism carried by said disk and operative on the friction surface of said pulley rim, said clutch mechanism including an adjusting lever that projects at the outer side of said disk, an annular shoulder on said shaft operative on the projecting end of said lever, an arm pivoted to a fixed support and operative on said shoulder, and a screw operative on said arm, to vary the predetermined speed at which said clutch mechanism will be thrown out of action by centrifugal force.

2. The combmination with a shaft and a pulley primarily loose thereon, said pulley having a rim with an internal friction surface, a lever support carried by said shaft, clutch levers pivoted to said support and having shoes engageable with the friction surface of the pulley rim, weighted levers also pivoted to said lever support and operatively connected to said clutch levers, a rocker pivoted on said shaft, links connecting said rocker to one of each set of levers, and a spring operative on said rocker and exerting a force tending to hold said shoes engaged with said pulley rim.

3. The combination with a shaft and a pulley primarily loose thereon, said pulley having a rim with an internal friction surface, a lever support carried by said shaft, clutch levers pivoted to said support and having shoes engageable with the friction surface of the pulley rim, weighted levers also pivoted to said lever support and operatively connected to said clutch levers, a rocker pivoted on said shaft, links connecting said rocker to one of each set of levers, a spring operative on said rocker and exerting a force tending to hold said shoes engaged with said pulley rim, an anchor lever pivoted to said support and affording an adjustable base of reaction for said spring, and means for setting said anchor lever in different adjustments.

4. The combination with a shaft and a pulley primarily loose thereon, said pulley having a rim with an internal friction surface, a lever support carried by said shaft, clutch levers pivoted to said support and having shoes engageable with the friction surface of the pulley rim, weighted levers also pivoted to said lever support and operatively connected to said clutch levers, a rocker pivoted on said shaft, links connecting said rocker to one of each set of levers, a spring operative on said rocker and exerting a force tending to hold said shoes engaged with said pulley rim, an anchor lever pivoted to said support, affording an adjustable base of reaction for said spring and having an end projecting at the outer side of said support, a collar axially movable on said shaft for setting said anchor lever in different positions while said shaft and pulley are being rotated, an arm pivoted to a fixed support and operative on said collar, and a screw for adjusting said arm.

5. The combination with a shaft and a pulley primarily loose thereon, said pulley having a rim with an internal friction surface, a lever support carried by said shaft, clutch levers pivoted to said support and having shoes engageable with the friction surface of the pulley rim, weighted levers also pivoted to said lever support and operatively connected to said clutch levers, a rocker pivoted on said shaft, links connecting said rocker to one of each set of levers, a spring operative on said rocker and exerting a force tending to hold said shoes engaged with said pulley rim, an anchor lever pivoted to said lever support and affording an adjustable base of reaction for said spring, said anchor lever having an end projecting on the outer side of said support, a collar axially adjustable on said shaft and operative on the projecting end of said anchor lever, a pedestal on which said shaft is journaled, an arm pivoted to said pedestal and operative on said collar, and a screw-rod swivelled in said pedestal and operative on said arm to set the clutch mechanism to release under different predetermined speeds.

6. The combination with a shaft and a pulley primarily loose thereon, said pulley having a rim with an internal friction surface, a disk secured to said shaft and closing one side of said pulley, clutch levers pivoted to said disk and provided with shoes that are engageable with the friction surface of the pulley rim, weighted levers pivoted to said disk and having short ends operative on the free ends of said clutch levers, a rocker pivoted on said shaft, links connecting the weighted levers to the opposite ends of said rocker, a spring operative on said rocker, an anchor lever pivoted to said disk and to which the other end of said spring is anchored, said anchor lever having an end projecting on the outer side of said disk, a collar axially adjustable on said shaft and operative on the projecting end of said anchor lever, and means for adjusting said collar while said shaft and pulley are being rotated.

In testimony whereof I affix my signature.

CHARLES F. ASPLUND.